US008370278B2

(12) United States Patent
Vadlamani et al.

(10) Patent No.: US 8,370,278 B2
(45) Date of Patent: Feb. 5, 2013

(54) ONTOLOGICAL CATEGORIZATION OF QUESTION CONCEPTS FROM DOCUMENT SUMMARIES

(75) Inventors: Viswanath Vadlamani, Redmond, WA (US); Abhinai Srivastava, Seattle, WA (US); Tarek Najm, Kirkland, WA (US); Munirathnam Srikanth, Redmond, WA (US); Phani Vaddadi, Issaquah, WA (US); Arungunram Chandrasekaran Surendran, Sammamish, WA (US)

(73) Assignee: Microsoft Corporation, Redmond, WA (US)

( * ) Notice: Subject to any disclaimer, the term of this patent is extended or adjusted under 35 U.S.C. 154(b) by 467 days.

(21) Appl. No.: 12/719,600

(22) Filed: Mar. 8, 2010

(65) Prior Publication Data

US 2011/0218947 A1    Sep. 8, 2011

(51) Int. Cl.
*G06F 15/18* (2006.01)

(52) U.S. Cl. ......................................................... 706/12

(58) Field of Classification Search ........................ None
See application file for complete search history.

(56) References Cited

U.S. PATENT DOCUMENTS

| 6,961,954 | B1 | 11/2005 | Maybury |
| 7,558,778 | B2 | 7/2009 | Carus |
| 7,660,813 | B2 | 2/2010 | Milic-Frayling |
| 2008/0301095 | A1 | 12/2008 | Zhu |
| 2009/0150364 | A1 | 6/2009 | Melander et al. |
| 2010/0049498 | A1 | 2/2010 | Cao |

OTHER PUBLICATIONS

Mihalcea et al., "TextRank: Bringing Order Into Texts", 2004, in Coference of Empirical Methlods in Natural Language Processing, pp. 1-8.*

Jindal et al., "Identifiying Comparative Sentences in Text Documents", 2006, SIGIR, pp. 244-251.*
Aldabe et al., "Ariklturri: An Automatic Question Generator Based on Corpora and NLP Techniques", 2006, ITS, pp. 584-594.*
Vaquero, Antonio, et al., A Review of Common Problems in Linguistic Resources and a new way to Represent Ontological Relations—Published Date: 2007 http://citeseerx.ist.psu.edu/viewdoc/download?doi=10.1.1.93.1208&rep=rep1&type=pdf.
Harada, M., et al., QA System Metis based on Semantic Graph Matching at NTCI R 6—Published Date: 2007 http://research.nii.ac.jp/ntcir/workshop/OnlineProceedings6/NTCIR/16.pdf.
Bethard, Steven, et al., Semantic Integration in Learning from Text—Published Date: 2007 http://www.cs.colorado.edu/~martin/Papers/SSS07SBethard.pdf.
Melli, Gabor, et al., Description of Squash, the SFU Question Answering Summary Handler for the DUC-2006 Summarization Task—Published Date: 2006 http://citeseerx.ist.psu.edu/viewdoc/download?doi=10.1.1.66.7621&rep=rep1&type=pdf.
Sekine, Satoshi, et al., Sentence Extraction with Information Extraction technique—Published Date: 2001 http://www.cs.nyu.edu/~sekine/papers/duc01.pdf.

(Continued)

*Primary Examiner* — Jeffrey A Gaffin
*Assistant Examiner* — Paulinho E Smith
(74) *Attorney, Agent, or Firm* — Shook Hardy & Bacon LLP (57) ABSTRACT

Electronic documents are analyzed to identify assertions, which are inverted to generate questions that may be answered by the assertions. A document or a corpus of electronic documents may be analyzed to identify entities and relationships among entities within the text of the document(s). Assertions are identified based on the entities and relationships among the entities. Each assertion represents a fact about an entity, and a group of assertions represents a summary of the document or document corpus. The assertions are inverted to generate questions that may be answered by the assertions. The questions may be further analyzed to identify relevant concepts and topics and to cluster the questions around the concepts and topics. A combined graph may also be generated that facilitates traversal among topics, concepts, questions, assertions, document summaries, and documents.

19 Claims, 4 Drawing Sheets

OTHER PUBLICATIONS

White, Michael, et al., Multidocument Summarization via Information Extraction—Published Date: 2001 http://wing.comp.nus.edu.sg/acl/H/H01/H01-1054.pdf.

McCreary, Dan, Entity Extraction and the Semantic Web, Published Date: Jan. 12, 2009. http://www.semanticuniverse.com/articles-entity-extraction-and-semantic.

* cited by examiner

ONTOLOGICAL CATEGORIZATION OF QUESTION CONCEPTS FROM DOCUMENT SUMMARIES

BACKGROUND

Although computer systems can store a wealth of information, it can often be difficult for users to find specific information or effectively explore a particular subject area of interest. The information about an event or a topic is usually spread across multiple electronic documents, which may be stored in various locations. As such, assertions of facts regarding an event or a topic are typically spread across multiple documents making it difficult to aggregate and form a cohesive unit of knowledge regarding the event or topic. Further, even when facts about an event or topic are identified, they are typically not organized into meaningful clusters to form a higher level of understanding and representation. This poses a significant challenge when trying to articulate topics and categories of questions that can be answered by an electronic document corpus.

SUMMARY

This summary is provided to introduce a selection of concepts in a simplified form that are further described below in the Detailed Description. This summary is not intended to identify key features or essential features of the claimed subject matter, nor is it intended to be used as an aid in determining the scope of the claimed subject matter.

Embodiments of the present invention relate to identifying assertions in documents and inverting the assertions to generate questions that may be answered by the assertions in the documents. When a document or corpus of documents is analyzed, entities and relationships among the entities are identified from the text. Assertions of facts concerning the entities are generated based on the extracted entities and relationships. The assertions are inverted to generate questions that may be answered by the assertions. In some embodiments, questions are grouped around concepts and topics to which they pertain. A combined graph may further be generated that facilitates traversal among topics, concepts, questions, assertions, document summaries, and documents.

BRIEF DESCRIPTION OF THE DRAWINGS

The present invention is described in detail below with reference to the attached drawing figures, wherein.

DETAILED DESCRIPTION

The subject matter of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Moreover, although the terms "step" and/or "block" may be used herein to connote different elements of methods employed, the terms should not be interpreted as implying any particular order among or between various steps herein disclosed unless and except when the order of individual steps is explicitly described.

Embodiments of the present invention are generally directed to extracting assertions from documents and inverting the assertions to generate corresponding questions that may be answered by the extracted assertions. When a document or corpus of documents is analyzed, entities and relationships among entities are extracted from document text. In addition, assertions are identified based on the extracted entities and relationships. Each assertion represents a fact about an entity. A collection of valid assertions represents a summary of the document or the corpus of documents being analyzed.

The assertions are inverted to provide a set of questions that can be answered by the assertions from the document or corpus of documents. In some embodiments, the questions are further analyzed to identify relevant concepts and topics, and the questions may be clustered around the concepts and topics. A combined graph is generated that allows traversal of the nodes from multiple vantage points. For instance, the graph may be traversed from topics, to concepts, to questions, to assertions, to summaries, and to documents. The graph may be traversed from any location in either direction.

The information generated from embodiments of the present invention may be used in a number of practical applications. Generally, embodiments provide a repository of information that may be traversed based on user intent. For instance, when questions are presented to a search engine, corresponding questions generated by the inversion process may be identified and used to determine answers to the questions and the documents from where the answers were derived. As another example, the information derived from embodiments of the present invention may be used to enhance the knowledge in a knowledge base that may be used to serve knowledge content to users.

Accordingly, in one aspect, an embodiment of the present invention is directed to one or more computer-readable media storing computer-useable instructions that, when used by one or more computing devices, cause the one or more computing devices to perform a method. The method includes identifying a document corpus comprising one or more documents. The method also includes extracting entities within text of the one or more documents and extracting relationships between entities based on the text of the one or more documents. The method further includes identifying a plurality of assertions based on the entities and relationships extracted from the text of the one or more documents. The method still further includes inverting the plurality of assertions to generate a plurality of questions.

In another embodiment, an aspect of the invention is directed to a computer system including one or more processors and one or more computer storage media. The computer system includes a document analyzer, a question generator, and a concept/topic engine. The document analyzer analyzes documents and identifies entities and relationships among entities in text of the documents, wherein the document analyzer also identifies assertions based on the entities and relationships identified from the text of the documents. The question generator inverts the assertions to generate a plurality of questions that may be answered by the assertions. The concept/topic engine identifies concepts and/or topics associated with the plurality of questions and clusters questions around the concepts and/or topics.

A further embodiment of the present invention is directed to one or more computer-readable media storing computer-useable instructions that, when used by one or more computing devices, cause the one or more computing devices to perform a method. The method includes receiving one or more documents, parsing the one or more documents to identify sentences, and analyzing the sentences to identify a subset of the sentences as important sentences indicative of an event or topic discussed by the one or more documents. The method also includes identifying entities and relationships among the entities from text of the important sentences and creating an entity-relationship graph based on the identified entities and relationships, wherein nodes in the entity-relationship graph represent entities and wherein edges between nodes in the entity-relationship graph represent relationships between entities. The method further includes identifying a plurality of assertions by analyzing the entity-relationship graph. The method also includes inverting the plurality of assertions to generate a plurality of questions and generating a question graph based on the plurality of questions. The method further includes analyzing the questions in the questions graph to identify relevant concepts and/or topics associated with the questions and clustering the questions around the relevant concepts and/or topics. The method still further includes generating a combined graph that allows traversal among the concepts and/or topics, the questions, the assertions, and the one or more documents.

Figure 1:
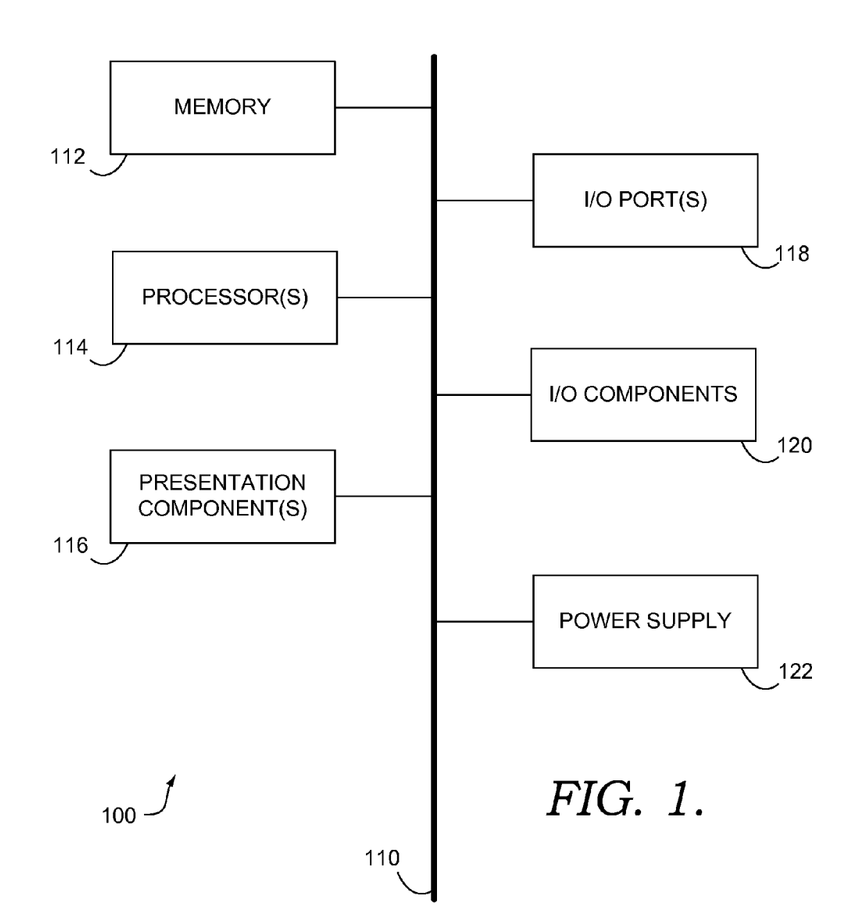
FIG. 1 is a block diagram of an exemplary computing environment suitable for use in implementing embodiments of the present invention.

Having briefly described an overview of embodiments of the present invention, an exemplary operating environment in which embodiments of the present invention may be implemented is described below in order to provide a general context for various aspects of the present invention. Referring initially to FIG. 1 in particular, an exemplary operating environment for implementing embodiments of the present invention is shown and designated generally as computing device 100. Computing device 100 is but one example of a suitable computing environment and is not intended to suggest any limitation as to the scope of use or functionality of the invention. Neither should the computing device 100 be interpreted as having any dependency or requirement relating to any one or combination of components illustrated.

The invention may be described in the general context of computer code or machine-useable instructions, including computer-executable instructions such as program modules, being executed by a computer or other machine, such as a personal data assistant or other handheld device. Generally, program modules including routines, programs, objects, components, data structures, etc., refer to code that perform particular tasks or implement particular abstract data types. The invention may be practiced in a variety of system configurations, including hand-held devices, consumer electronics, general-purpose computers, more specialty computing devices, etc. The invention may also be practiced in distributed computing environments where tasks are performed by remote-processing devices that are linked through a communications network.

With reference to FIG. 1, computing device 100 includes a bus 110 that directly or indirectly couples the following devices: memory 112, one or more processors 114, one or more presentation components 116, input/output ports 118, input/output components 120, and an illustrative power supply 122. Bus 110 represents what may be one or more busses (such as an address bus, data bus, or combination thereof). Although the various blocks of FIG. 1 are shown with lines for the sake of clarity, in reality, these blocks represent logical, not necessarily actual, components. For example, one may consider a presentation component such as a display device to be an I/O component. Also, processors have memory. We recognize that such is the nature of the art, and reiterate that the diagram of FIG. 1 is merely illustrative of an exemplary computing device that can be used in connection with one or more embodiments of the present invention. Distinction is not made between such categories as "workstation," "server," "laptop," "hand-held device," etc., as all are contemplated within the scope of FIG. 1 and reference to "computing device."

Computing device 100 typically includes a variety of computer-readable media. Computer-readable media can be any available media that can be accessed by computing device 100 and includes both volatile and nonvolatile media, removable and non-removable media implemented in any method or technology for storage of information such as computer-readable instructions, data structures, program modules or other data. Computer-readable media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computing device 100. Combinations of any of the above should also be included within the scope of computer-readable media.

Memory 112 includes computer-storage media in the form of volatile and/or nonvolatile memory. The memory may be removable, nonremovable, or a combination thereof. Exemplary hardware devices include solid-state memory, hard drives, optical-disc drives, etc. Computing device 100 includes one or more processors that read data from various entities such as memory 112 or I/O components 120. Presentation component(s) 116 present data indications to a user or other device. Exemplary presentation components include a display device, speaker, printing component, vibrating component, etc.

I/O ports 118 allow computing device 100 to be logically coupled to other devices including I/O components 120, some of which may be built in. Illustrative components include a microphone, joystick, game pad, satellite dish, scanner, printer, wireless device, etc.

Figure 2:
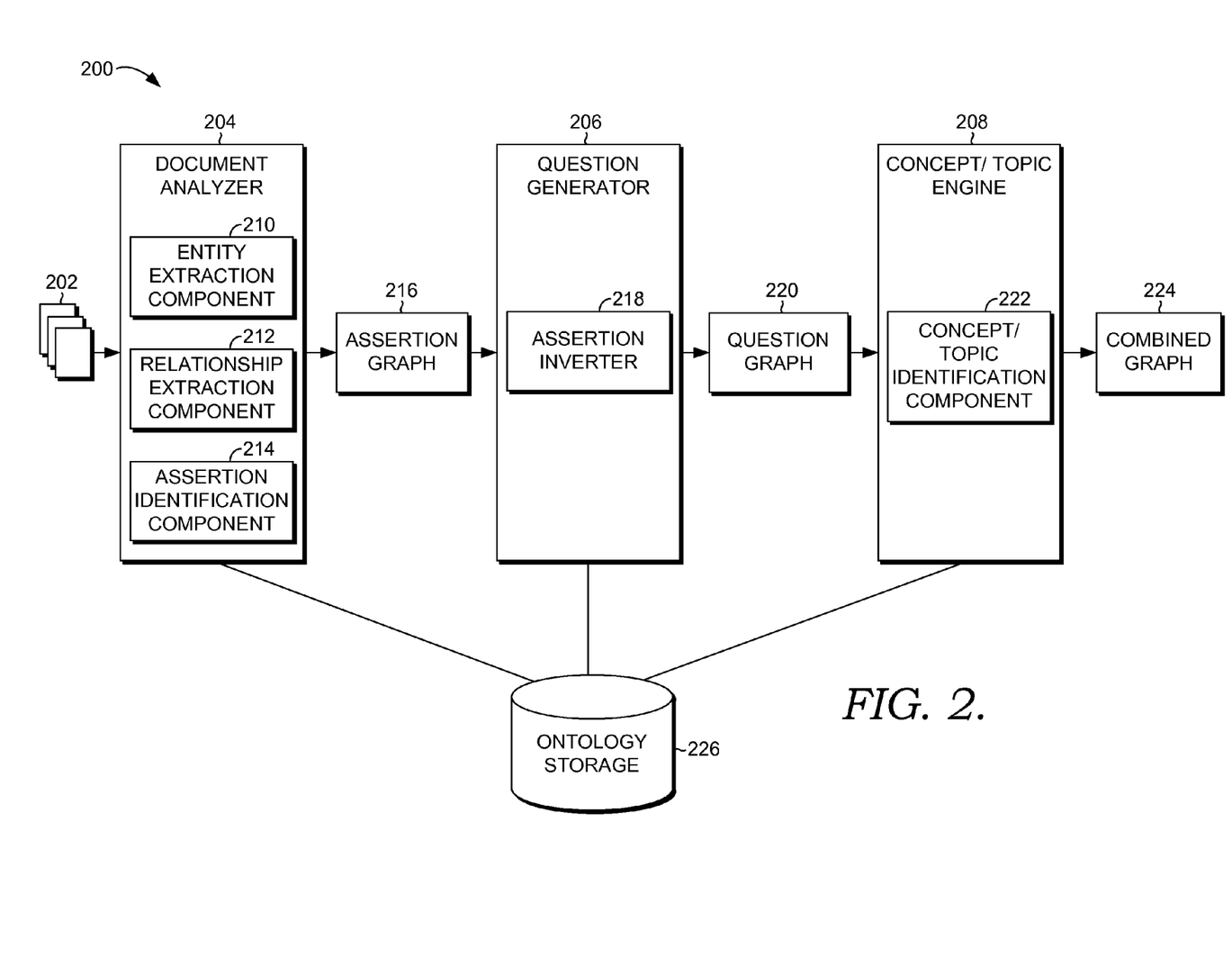
FIG. 2 is a block diagram of an exemplary system in which embodiments of the invention may be employed.

As indicated previously, embodiments of the present invention are directed to identifying assertions in documents and inverting the assertions to generate questions that may be answered by the assertions. Referring now to FIG. 2, a block diagram is provided illustrating an exemplary system 200 in which embodiments of the present invention may be employed. It should be understood that this and other arrangements described herein are set forth only as examples. Other arrangements and elements (e.g., machines, interfaces, functions, orders, and groupings of functions, etc.) can be used in addition to or instead of those shown, and some elements may be omitted altogether. Further, many of the elements described herein are functional entities that may be implemented as discrete or distributed components or in conjunction with other components, and in any suitable combination and location. Various functions described herein as being performed by one or more entities may be carried out by hardware, firmware, and/or software. For instance, various functions may be carried out by a processor executing instructions stored in memory.

Among other components not shown, the system 200 may include a document analyzer 204, a question generator 206, and a concept/topic engine 208. Each of the components shown in FIG. 2 may reside on any type of computing device, such as computing device 100 described with reference to FIG. 1, for example. The components may reside on a single computing device or on multiple computing devices, which may communicate with each other via a network (not shown) in a distributed computing environment. Additionally, other components not shown may also be included within the system 200.

In accordance with embodiments of the present invention, the system 200 operates to analyze one or more documents in a collection of documents 202 to extract assertions from the documents and to generate questions based on the assertions. A document from the document corpus 202 is initially analyzed using the document analyzer 204.

As shown in FIG. 2, the document analyzer 204 includes an entity extraction component 212, relationship extraction component 214, and an assertion identification component 214. The entity extraction component 210 operates to identify entities within the text of the document being analyzed, and the relationship extraction component 212 identifies relationships among extracted entities.

In some embodiments, the entity extraction component 210 and the relationship extraction component 212 operate over the entire text of the document being analyzed. In other embodiments, the entity extraction component 210 and the relationship extraction component 212 operate over only a portion of the document being analyzed. For instance, in one embodiment, sentences contained in the document are initially processed, and important sentences that are indicative of the event or topic being discussed are identified. In such embodiments, the entity extraction component 210 and relationship extraction component 212 extract entities and relationships from the important sentences only.

In some embodiments, one or more ontologies from ontology storage 226 may be used to facilitate selection of important sentences and/or extraction of entities and relationships from the document corpus 202. Each ontology may include a collection of words and phrases defining concepts and relationships between the concepts. The concepts and relations in the ontology are associated with models that characterize the lexical, syntactic, and semantic patterns corresponding to the occurrence of instances of concepts, certain types of entities and relations in a sentence. These models may be used to detect and extract the occurrence of concepts, entities, and relations from a sentence.

The assertion identification component 214 operates to identify assertions from the text of the document being analyzed based on the entities and relationships extracted by the entity extraction component 210 and the relationship extraction component 212. In some embodiments, an entity-relationship graph is generated based on extracted entities and relationships. Nodes in the entity-relationship graph represent extracted entities, while edges between nodes represent extracted relationships. Assertions may be identified from the entity-relationship graph by analyzing the relationships among entities. Each assertion represents a fact about an entity. The collection of assertions can be considered as a summary of the document being analyzed. Additionally, the collection of assertions may be used to generate an assertion graph 216, which may also identify entities and documents associated with each assertion.

The assertions are further processed by the question generator 206 to generate questions from the assertions. The question generator 206 includes an assertion inventor 218, which operates to invert assertions to generate questions. Assertions may be inverted to form questions in a number of different ways within the scope of embodiments of the present invention. In some embodiments, rule-based transformations may be used to invert assertions. The rules may specify the type of question based on the type of entities and/or relationships of an assertion (e.g., who, where, when, what, why, how, etc. based on type of entity and/or relationship of an assertion). For instance, when the entity of an assertion is a person, the inversion may generate a who question. As another example, when the entity of an assertion is a location, the inversion may generate a where question. As a further example, when the entity of an assertion is a date, the inversion may generate a when question. The rules may also determine the type of question based on the subject and/or predicate of an assertion. In further embodiments, more sophisticated algorithms, such as, for instance, machine learning techniques, may be employed to invert assertions to generate questions.

In embodiments, the question generator 206 provides a question graph 220, which comprises the collection of questions generated by inverting assertions from the assertion graph 216. The question graph 220 is then operated on by the concept/topic engine 208. The concept/topic engine 208 includes a concept/topic identification component 222 that analyzes questions in the question graph 220 to identify concepts and topics relevant to the questions. Questions may be clustered based on identified concepts and topics. In some embodiments, the concept/topic identification component 222 leverages a domain ontology from the ontology storage 226 to identify relevant concepts and topics for questions. For instance, the concepts and relations in a question may be detected and extracted in the same way such information is extracted from sentences. These concepts and relations are mapped to concepts in one or more domain ontologies. Certain concepts in the ontology are identified as topic concepts or the ontology describes concepts in a particular topic of interest. This mapping to domain/topic concepts identifies the relevant concepts and topics in a given question.

Figure 3:
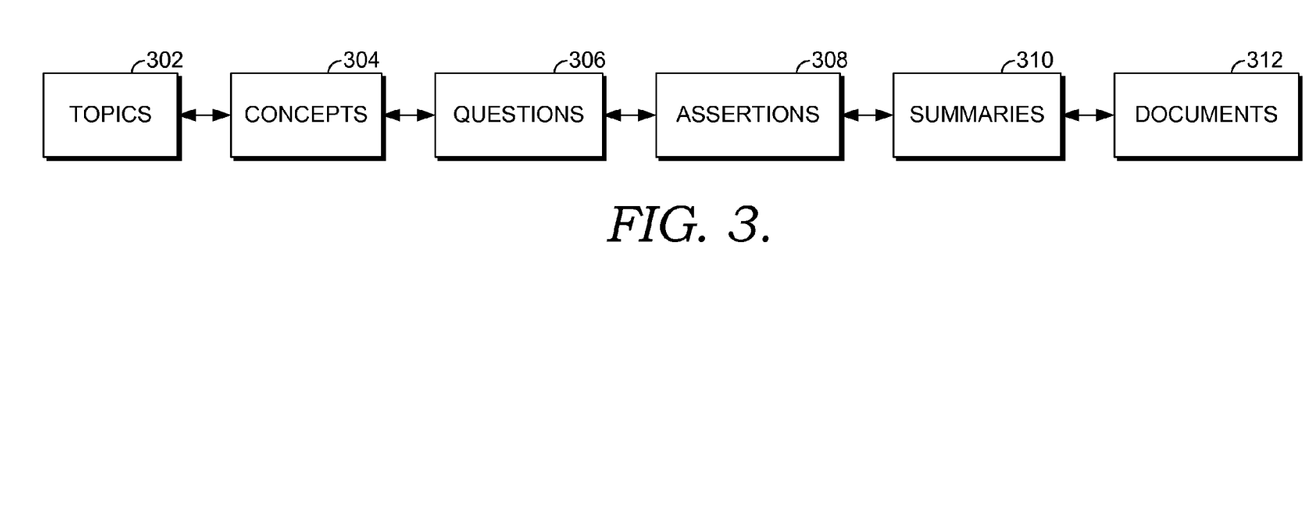
FIG. 3 is a block diagram showing traversal of a combined graph in accordance with an embodiment of the present invention.

Based on the process performed by the system 200, a combined graph 224 is generated that allows traversal of the nodes from multiple vantage points. By way of illustration, FIG. 3 illustrates traversal of a combined graph generated in accordance with an embodiment of the present invention. As shown in FIG. 3, the graph may be traversed from topics 302, to concepts 304, to questions 306, to assertions 308, to document summaries 310, and to documents 312. The graph may be traversed from any location in either direction.

Figure 4:
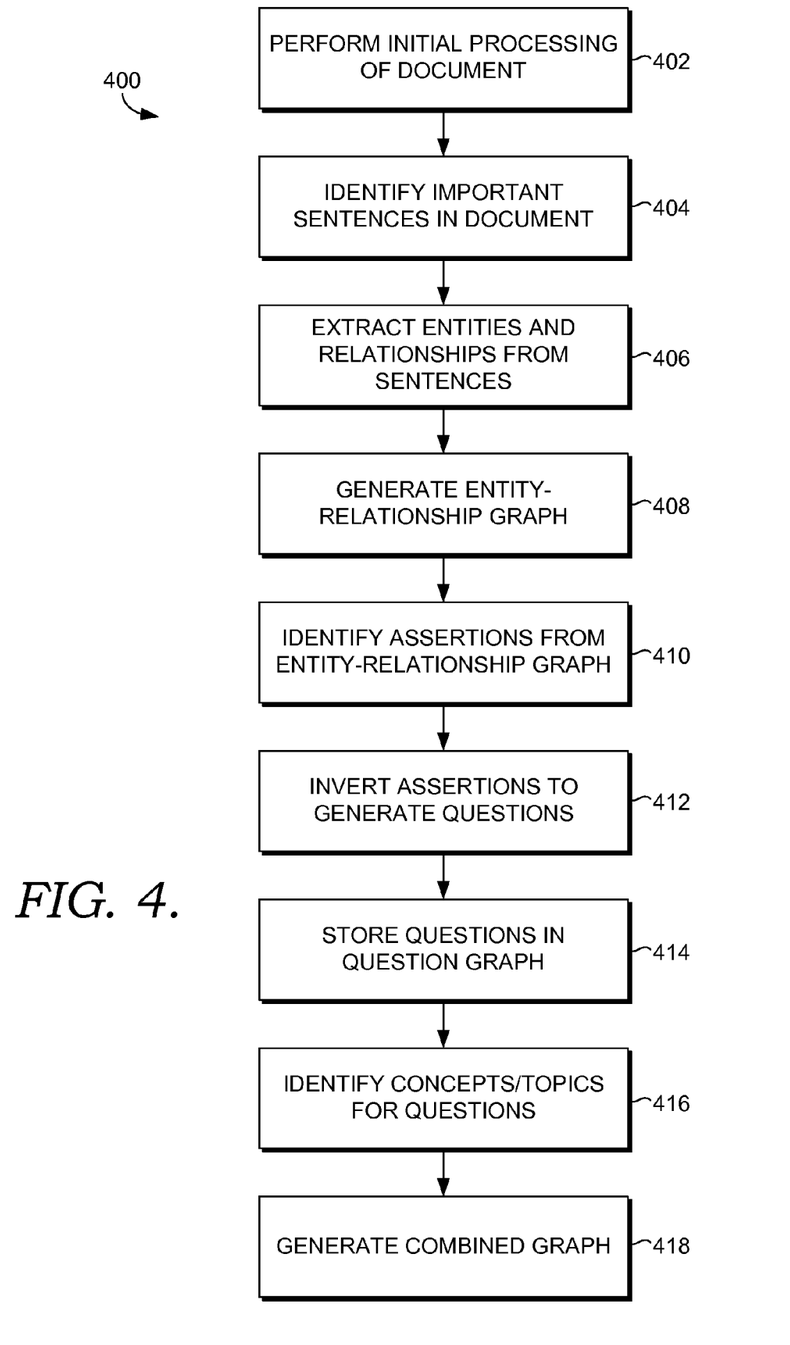
FIG. 4 is a flow diagram showing an overall method for analyzing a document to identify assertions and questions in accordance with an embodiment of the present invention.

Turning to FIG. 4, a flow diagram is provided that illustrates a method 400 for identifying assertions in documents and generating questions from the assertions in accordance with an embodiment of the present invention. As shown at block 402, the document being analyzed is initially processed, which may include parsing the document to identify individual sentences.

The individual sentences are analyzed to identify important sentences that are indicative of the event or topic that the document discusses, as shown at block 404. Important sentences may be identified using a number of different methods in accordance with various embodiments of the present invention. In one embodiment, important sentences are identified by analyzing the frequency with which words appear in the document. The words that occur most frequently (after the stop words have been filtered out) are determined to be important words and used to identify important sentences. In some embodiment, words may also be weighted based on the location in the document that they occur (e.g., in the title, first paragraph, middle paragraph, etc.). Another approach to identifying important sentences may include using an ontology or knowledge base that includes a dictionary of important concepts and words. Sentences containing important concepts and words from the ontology or knowledge base are identified as being important.

A score may be generated for each sentence based on factors such as those indicated above (e.g., based on importance of words, frequency of words, etc.). The sentences may be sorted based on corresponding scores, which are used to prioritize the sentences. A number of sentences may be identified as important sentences and selected for further processing based on the scores. In some embodiments, the top N sentences are selected for further processing. In other embodiments, sentences having scores satisfying a predetermined threshold are selected. In still further embodiments, sentences having scores significantly higher than scores for other sentences are selected. Any and all such combinations are contemplated to be within the scope of embodiments of the present invention.

The important sentences are further analyzed to extract entities and relationships, as shown at block 406. In one embodiment, one or more ontologies may be used to extract entities and relationships from sentence. The concepts and relations in the ontology are associated with models that characterize the lexical, syntactic, and semantic patterns corresponding to the occurrence of instances of concepts, certain types of entities and relations in a sentence. These models may be used to detect and extract the occurrence of concepts, entities, and relations from a sentence.

An entity-relationship graph is generated using the extracted entities and relationships, as shown at block 408. The nodes in the entity-relationship graph represent entities while the edges between nodes represent relationships between entities.

Assertions are identified using the entity-relationship graph, as shown at block 410. Generally, an assertion comprises a fact about one or more entities. An assertion may be based on one entity's relationship with another entity in the entity-relationship graph. The collection of valid assertions for a document may be considered as a summary of the document.

Assertions are inverted to create questions, as shown at block 412. Assertions may be inverted to form questions using a number of different methods in accordance with various embodiments of the present invention. In one embodiment, inversion of assertions to generate questions may involve transformations on the entity-relationship graph. This may include rule-based transformations. The rules used in the transformation may dictate the type of question based on the type of entity and/or relationship of an assertion (e.g., who, where, when, what, why, how, etc. based on type of entity and/or relationship of an assertion). For instance, when the entity of an assertion is a person, the inversion may generate a who question. As another example, when the entity of an assertion is a location, the inversion may generate a where question. As a further example, when the entity of an assertion is a date, the inversion may generate a when question. The rules may also determine the type of question based on the subject and/or predicate of an assertion. In further embodiments, more sophisticated algorithms, such as, for instance, machine learning techniques, may be employed to invert assertions to generate questions.

The collection of questions generated by inverting assertions is stored in a question graph, as shown at block 414. The questions are further analyzed using a domain ontology to generate a better understanding of the questions, as shown at block 416. This process includes identifying concepts and topics to which the questions pertain. As a result, questions may be clustered around higher-level concepts and topics. In embodiments, concepts and topics are identified in questions by employing an ontology. Question concepts are mapped to concepts in the ontology. The concepts can be organized in different hierarchies in the ontology with each hierarchy representing an ontological relationship like IS-A (e.g. 'Car' is an 'Automobile'). Each question is represented by a selection or subgraph of concepts in the ontology. The projection of question concepts to higher order concepts in the ontology clusters the questions. For example, questions with concepts 'car', 'truck', 'van' are clustered at the concept of 'automobile'. Weights associated with question concepts and relations can be used to measure the relevance of membership in a cluster.

A combined graph is generated at block 418 that can be traversed from topics/concepts, to questions, to assertions, to document summaries, and to documents.

The following example is provided to illustrate operation in accordance with some embodiments of the present invention. Suppose, for instance, that a news announcement discussing Microsoft's acquisition of aQuantive is analyzed. Analysis of the document may identify the following sentences from the document. These sentences may include all the sentences of the document or may be only a subset of the sentences from the document (e.g., sentences identified as the important sentences from the document).

Today, Microsoft announced that the company is acquiring aQuantive.
  aQuantive is an online display advertising agency and technology company.
  Microsoft's CEO, Steve Ballmer, said that the $6B price tag for the acquisition of aQuantive is going to make Microsoft a serious contender in the online display advertising business.
  As a result of the acquisition, Microsoft will form a new division overseeing the advertising business.
  The CEO of aQuantive, Brian McAndrews, will take on the role of senior vice president of advertising at the newly formed advertising division.

These sentences from the news announcement are analyzed to identify and extract entities and relationships between entities. Based on the extracted entities and relationships, a number of assertions are identified. For instance, a list is provided below that includes a number of assertions derived from entities and relationships found in the sentences above.

Microsoft is acquiring aQuantive for $6B.
  Steve Ballmer is the CEO of Microsoft.
  Brian McAndrews is the CEO of aQuantive.
  Brian McAndrews will be the senior vice president of the newly formed advertising division at Microsoft.

Each assertion may be represented as a collection of entities and relationships, for instance, as shown below:
  <Company:Microsoft><relationship: acquires><Company:aQuantive><relationship:acquisition price><Price:$6B>
  <Person:Steve B allmer><relationship:is ><Position:CEO><relationship:of ><Company:Microsoft>
  <Person:Brian McAndrews><relationship:is ><Position:CEO><relationship:of ><Company:aQuantive>

The assertions may be inverted to generate a number of questions. For example, below are examples of questions that may be generated by inverting some of the above assertion examples:
  What company acquired aQuantive?
  How much was aQuantive acquired for?
  Who is the CEO of Microsoft?
  Who is the CEO of aQuantive?

As discussed above, questions generated by inverting assertions may be further processed to identify relevant concepts and topics, which may be used for clustering the questions. In the above example, the relevant concepts and topics identified may include acquisition, technology, and advertising. The questions may be clustered around these concepts and topics.

As can be understood, embodiments of the present invention provide for identifying assertions from documents and inverting the assertions to form questions that may be answered by the assertions. The present invention has been described in relation to particular embodiments, which are intended in all respects to be illustrative rather than restrictive. Alternative embodiments will become apparent to those of ordinary skill in the art to which the present invention pertains without departing from its scope.

From the foregoing, it will be seen that this invention is one well adapted to attain all the ends and objects set forth above, together with other advantages which are obvious and inherent to the system and method. It will be understood that certain features and subcombinations are of utility and may be employed without reference to other features and subcombinations. This is contemplated by and is within the scope of the claims.

What is claimed is:

1. One or more computer-readable storage media hardware device storing computer-useable instructions that, when used by one or more computing devices, cause the one or more computing devices to perform a method comprising:
   identifying a document corpus comprising one or more documents; extracting entities within text of the one or more documents;
   extracting relationships between entities based on the text of the one or more documents;
   identifying a plurality of assertions based on the entities and relationships extracted from the text of the one or more documents; and
   inverting the plurality of assertions to generate a plurality of questions; and
   generating a question graph from the plurality of questions.

2. The one or more computer-readable storage media of claim 1, wherein the method further comprises parsing the one or more documents to identify a plurality of sentences, and analyzing the plurality of sentences to identify important sentences, wherein the entities and relationships are extracted from the important sentences.

3. The one or more computer-readable storage media of claim 2, wherein the important sentences are identified by analyzing the frequency with which words appear in each sentence of the one or more documents.

4. The one or more computer-readable storage media of claim 2, wherein the important sentences are identified by using a dictionary of important concepts and words to identify sentences containing important concepts and words from the dictionary of important concepts and words.

5. The one or more computer-readable storage media of claim 1, wherein the method further comprises generating an entity-relationship graph using the entities and relationships extracted from the text of the one or more documents, wherein nodes in the entity-relationship graph represent entities and wherein edges between nodes in the entity-relationship graph represent relationships between entities.

6. The one or more computer-readable storage media of claim 5, wherein identifying the plurality of assertions based on the entities and relationships extracted from the text of the one or more documents comprises identifying the plurality of assertions by analyzing the entity-relationship graph.

7. The one or more computer-readable storage media claim 1, wherein the plurality of assertions comprise a summary of the one or more documents.

8. The one or more computer-readable storage media of claim 1, wherein the method further comprises generating an assertion graph based on the plurality of assertions.

9. The one or more computer-readable storage media of claim 1, wherein entities and documents are identified with assertions in the assertion graph.

10. The one or more computer-readable storage media of claim 1, wherein inverting the plurality of assertions to generate the plurality of questions comprises using rule-based transformations to invert the plurality of assertions to generate the plurality of questions, wherein the rule-based transformations are based on a plurality of rules that dictate a type of question based on a type of entity of an assertion.

11. The one or more computer-readable storage media of claim 1, wherein inverting the plurality of assertions to generate the plurality of questions comprises using machine-learning algorithms.

12. The one or more computer-readable storage media of claim 1, wherein the method further comprises identifying topics associated with the plurality of questions and clustering the questions around the topics.

13. The one or more computer-readable storage media of claim 1, wherein the method further comprises generating a combined graph that allows traversal among the topics, the questions, the assertions, and the one or more documents.

14. A computer system including one or more processors and one or more computer storage media, the computer system comprising:
   a document analyzer that analyzes documents and identifies entities and relationships among entities in text of the documents, wherein the document analyzer also identifies assertions based on the entities and relationships identified from the text of the documents;
   a question generator that inverts the assertions to generate a plurality of questions that may be answered by the assertions; and
   a concept/topic engine that identifies concepts and/or topics associated with the plurality of questions and clusters questions around the concepts and/or topics.

15. The computer system of claim 14, wherein the document analyzer identifies a subset of sentences from the documents as important sentences and identifies the entities and relationships from the important sentences.

16. The computer system of claim 14, wherein the question generator inverts the assertions to generate the plurality of questions by using rule-based transformations to invert the plurality of assertions to generate the plurality of questions, wherein the rule-based transformations are based on a plurality of rules that dictate a type of question based on a type of entity of an assertion.

17. The computer system of claim 14, wherein the concept/topic engine generates a combined graph that that allows traversal among the concepts and/or topics, the questions, the assertions, and the documents.

18. One or more computer-readable storage media hardware device storing computer-useable instructions that, when used by one or more computing devices, cause the one or more computing devices to perform a method comprising:
   receiving one or more documents;
   parsing the one or more documents to identify sentences;
   analyzing the sentences to identify a subset of the sentences as important sentences indicative of an event or topic discussed by the one or more documents;

identifying entities and relationships among the entities from text of the important sentences;

creating an entity-relationship graph based on the identified entities and relationships, wherein nodes in the entity-relationship graph represent entities and wherein edges between nodes in the entity-relationship graph represent relationships between entities;

identifying a plurality of assertions by analyzing the entity-relationship graph;

inverting the plurality of assertions to generate a plurality of questions;

generating a question graph based on the plurality of questions;

analyzing the questions in the questions graph to identify relevant concepts and/or topics associated with the questions and clustering the questions around the relevant concepts and/or topics; and generating a combined graph that allows traversal among the concepts and/or topics, the questions, the assertions, and the one or more documents.

19. The one or more computer-readable storage media of claim 18, wherein inverting the plurality of assertions to generate the plurality of questions comprises using rule-based transformations to invert the plurality of assertions to generate the plurality of questions, wherein the rule-based transformations are based on a plurality of rules that dictate a type of question based on a type of entity of an assertion.

* * * * *